US012742910B2

(12) United States Patent
Sakakibara et al.

(10) Patent No.: US 12,742,910 B2
(45) Date of Patent: Sep. 22, 2026

(54) ANTI-REFLECTION FILM

(71) Applicant: DAICEL CORPORATION, Osaka (JP)

(72) Inventors: Takahiro Sakakibara, Tokyo (JP); Kouichi Umemoto, Tokyo (JP); Ryouta Kojima, Tokyo (JP); Hiroki Kageyama, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 94 days.

(21) Appl. No.: 16/645,184

(22) PCT Filed: Aug. 6, 2018

(86) PCT No.: PCT/JP2018/029480
§ 371 (c)(1),
(2) Date: Mar. 6, 2020

(87) PCT Pub. No.: WO2019/049578
PCT Pub. Date: Mar. 14, 2019

(65) Prior Publication Data

US 2020/0282712 A1 Sep. 10, 2020

(30) Foreign Application Priority Data

Sep. 8, 2017 (JP) ................................ 2017-172771
Feb. 7, 2018 (JP) ................................ 2018-020017
Feb. 7, 2018 (JP) ................................ 2018-020018

(51) Int. Cl.
*G02B 1/111* (2015.01)
*B32B 27/18* (2006.01)
(Continued)

(52) U.S. Cl.
CPC .............. *G02B 1/111* (2013.01); *B32B 27/18* (2013.01); *B32B 27/20* (2013.01); *B32B 27/308* (2013.01);
(Continued)

(58) Field of Classification Search
CPC .. G02B 1/111; G02B 1/14; C09D 7/47; B32B 27/18; B32B 27/20; B32B 27/308;
(Continued)

(56) References Cited

U.S. PATENT DOCUMENTS 7,776,983 B2 8/2010 Terrazas et al.
7,887,910 B2 2/2011 Kuramoto et al.
(Continued)

FOREIGN PATENT DOCUMENTS

CN 101094876 A 12/2007
CN 101581801 A * 11/2009 ......... G06F 12/0246
(Continued)

OTHER PUBLICATIONS

Machine translation of CN 101581801 A (Year: 2009).*
(Continued)

*Primary Examiner* — Callie E Shosho
*Assistant Examiner* — Steven A Rice
(74) *Attorney, Agent, or Firm* — Birch, Stewart, Kolasch & Birch, LLP

(57) ABSTRACT

An anti-reflection film (X) of the present invention includes a laminated structure including a substrate (11), a hard coat layer (12), and an anti-reflection layer (13). The anti-reflection layer (13) contains a curable resin, low-refractive-index particles, and nanodiamond particles. The anti-reflection layer (13) may further contain a fluorine-containing curable compound. Such an anti-reflection film is suitable for achieving high scratch resistance together with high anti-reflective properties.

17 Claims, 1 Drawing Sheet

(51) Int. Cl.

| | |
|---|---|
| ***B32B 27/20*** | (2006.01) |
| ***B32B 27/30*** | (2006.01) |
| ***C08K 7/26*** | (2006.01) |
| ***C08K 9/06*** | (2006.01) |
| ***G02B 1/14*** | (2015.01) |
| *B82Y 30/00* | (2011.01) |

(52) U.S. Cl.
CPC .................. *C08K 7/26* (2013.01); *C08K 9/06* (2013.01); *G02B 1/14* (2015.01); *B82Y 30/00* (2013.01); *C08K 2201/005* (2013.01); *C08K 2201/011* (2013.01)

(58) Field of Classification Search
CPC ...... C08K 7/26; C08K 9/06; C08K 2201/005; C08K 2201/011; B82Y 30/00
USPC .......................................................... 428/323
See application file for complete search history.

(56) References Cited

U.S. PATENT DOCUMENTS

| | | | | |
|---|---|---|---|---|
| 9,523,795 | B2 | 12/2016 | Wakizaka et al. | |
| 10,036,831 | B2 | 7/2018 | Yu et al. | |
| 11,372,138 | B2 * | 6/2022 | Sakakibara | C08K 9/06 |
| 2002/0018886 | A1 * | 2/2002 | Matsufuji | C09D 7/68 428/328 |
| 2004/0142107 | A1 * | 7/2004 | Eriksson | B44C 5/04 427/407.1 |
| 2005/0224829 | A1 * | 10/2005 | Negley | H05B 33/04 257/E33.059 |
| 2006/0149012 | A1 * | 7/2006 | Terrazas | C08F 220/28 526/288 |
| 2009/0046379 | A1 | 2/2009 | Kuramoto et al. | |
| 2009/0135356 | A1 | 5/2009 | Ando | |
| 2009/0297828 | A1 * | 12/2009 | Shenderova | A61K 8/30 428/323 |
| 2010/0062189 | A1 * | 3/2010 | Yosomiya | G02B 1/14 526/170 |
| 2010/0118406 | A1 * | 5/2010 | Kobori | G02B 1/111 428/313.9 |
| 2012/0200933 | A1 | 8/2012 | Akiyama et al. | |
| 2012/0218637 | A1 * | 8/2012 | Shibayama | G02B 5/0242 359/585 |
| 2013/0135726 | A1 | 5/2013 | Wakizaka et al. | |
| 2014/0091253 | A1 * | 4/2014 | Myllymaki | C08K 3/22 252/75 |
| 2014/0193612 | A1 | 7/2014 | Yu et al. | |
| 2014/0296409 | A1 * | 10/2014 | Sikka | C08K 9/06 524/365 |
| 2015/0017386 | A1 * | 1/2015 | Kolb | G02B 1/118 428/149 |
| 2017/0205701 | A1 * | 7/2017 | Ide | G02B 5/0278 |
| 2018/0136369 | A1 | 5/2018 | Vergöhl et al. | |
| 2018/0203167 | A1 * | 7/2018 | Matsuo | G03B 21/62 |
| 2021/0122671 | A1 * | 4/2021 | Hart | G02B 1/14 |

FOREIGN PATENT DOCUMENTS

| | | | | | |
|---|---|---|---|---|---|
| CN | 102576095 | A | | 7/2012 | |
| CN | 104781325 | A | | 7/2015 | |
| JP | 2002-62401 | A | | 2/2002 | |
| JP | 2005010188 | A | * | 1/2005 | |
| JP | 2007-163754 | A | | 6/2007 | |
| JP | 2009-151270 | A | | 7/2009 | |
| JP | 2009-276738 | A | | 11/2009 | |
| JP | 2010243700 | A | * | 10/2010 | |
| JP | 2011-132117 | A | | 7/2011 | |
| JP | 2012240266 | A | * | 12/2012 | |
| JP | 2014-197135 | A | | 10/2014 | |
| JP | 2014-528983 | A | | 10/2014 | |
| JP | 2015-43046 | A | | 3/2015 | |
| JP | 2015-49462 | A | | 3/2015 | |
| JP | 2016-24456 | A | | 2/2016 | |
| JP | 2016-089062 | A | | 5/2016 | |
| JP | 2016-155889 | A | | 9/2016 | |
| JP | 2016-196616 | A | | 11/2016 | |
| JP | 2016-196617 | A | | 11/2016 | |
| JP | 2017-40936 | A | | 2/2017 | |
| JP | 2017083803 | A | * | 5/2017 | |
| JP | 2019119206 | A | * | 7/2019 | |
| KR | 10-2013-0050247 | A | | 5/2013 | |
| WO | WO 2006/121102 | A1 | | 11/2006 | |
| WO | WO2009/098883 | A1 | | 8/2009 | |
| WO | WO 2016/169825 | A1 | | 10/2016 | |
| WO | WO-2017010217 | A1 | * | 1/2017 | G02B 5/0242 |

OTHER PUBLICATIONS

Semenova, O. V., et al.; "Antireflection and protective films for silicon solar cells", 2014, IOP Conference Series: Materials Scisence and Engineering, vol. 66, pp. 1 and 5 (Year: 2014).*
Machine translation of JP 2005-010188 A (Year: 2005).*
Machine translation of JP 2010-243700 A (Year: 2010).*
Machine translation of JP 2012-240266 A (Year: 2012).*
Machine translation of JP 2017-083803 A (Year: 2017).*
Machine translation of KR 10-2013-0050247 A (Year: 2013).*
Machine translation of JP 2019-119206 A (Year: 2019).*
International Search Report, dated Oct. 30, 2018, for International Application No. PCT/JP2018/029480, with an English translation.
Japanese Office Action, dated Dec. 4, 2019, for Japanese Application No. 2018-020018, with an English translation.
Japanese Office Action, dated Jun. 25, 2019, for Japanese Application No. 2018-020018, with an English translation.
Written Opinion of the International Searching Authority, dated Oct. 30, 2018, for International Application No. PCT/JP2018/029480, with an English Translation.
Joeng et al., "Effect of a Silane Coupling Agent on the Optical and the Mechanical Characteristics of Nanodiamond/Acrylic Resin Composites," Journal of the Korean Physical Society (Oct. 2014), vol. 65, No. 7, pp. 1049-1053.
Machine Translation of JP 2009-276738. Retrieved Jul. 14, 2021.
Machine Translation of JP 2017-083803. Retrieved Jul. 14, 2021.
International Search Report, dated Oct. 30, 2018, for International Application No. PCT/JP2018/029481, with an English translation.
English translation of International Preliminary Report on Patentability and Written Opinion of the International Searching Authority, dated Oct. 30, 2018, for International Application No. PCT/JP2018/029481.
Taiwanese Office Action and Search Report for corresponding Taiwanese Application No. 107129917, dated Jul. 29, 2022.
Korean Office Action for Korean Application No. 10-2020-7009740, dated Sep. 21, 2022.
Taiwanese Office Action and Search Report for Taiwanese Application No. 107129917, dated Nov. 3, 2022.

* cited by examiner

ANTI-REFLECTION FILM

TECHNICAL FIELD

The present invention relates to an anti-reflection film. In addition, the present application claims priority to JP 2017-172771 filed on Sep. 8, 2017, JP 2018-020017 filed on Feb. 7, 2018, and JP 2018-020018 filed on Feb. 7, 2018, the entire contents of which are incorporated herein by reference.

BACKGROUND ART

An anti-reflection film for reducing external light reflection may be provided on a surface of a display, such as in tablet PCs and various television sets. The anti-reflection film includes, for example, an anti-reflection layer containing low-refractive-index particles as the outermost layer. Technology relating to such an anti-reflection film is described, for example, in Patent Documents 1 to 3 listed below.

CITATION LIST

Patent Document

Patent Document 1: JP 2009-151270 A
Patent Document 2: JP 2014-197135 A
Patent Document 3: JP 2017-40936 A

SUMMARY OF INVENTION

Technical Problem

The higher the content of the low-refractive-index particles in the anti-reflection layer of the anti-reflection film, the lower the net refractive index of the anti-reflection layer tends to be, and the anti-reflection function of the anti-reflection layer or the anti-reflection film is easy to ensure. In the anti-reflection layer, however, the higher the content of the low-refractive-index particles, the more the scratch resistance tends to decrease. To date, to improve the scratch resistance of the anti-reflection layer or the anti-reflection film, predetermined silica particles may be blended to the anti-reflection layer, which is the outer most layer, but this may fail to provide sufficient scratch resistance.

The present invention has been conceived under such circumstances, and an object of the present invention is to provide an anti-reflection film suitable for achieving high scratch resistance together with high anti-reflective properties.

Solution to Problem

The anti-reflection film provided by an embodiment of the present invention includes a laminated structure including a substrate, an anti-reflection layer, and a hard coat layer positioned between the substrate and the anti-reflection layer. The anti-reflection layer contains a curable resin, low-refractive-index particles, and nanodiamond particles. In an embodiment of the present invention, the low-refractive-index particles refer to particles exhibiting a refractive index from 1.10 to 1.45. The refractive index can be measured in accordance with JIS K 7142. In addition, in an embodiment of the present invention, the nanodiamond particles may be primary particles of nanodiamond or secondary particles of nanodiamond. The primary particles of nanodiamond refers to nanodiamond having a particle size of 10 nm or less.

The present anti-reflection film includes the laminated structure including the substrate, the hard coat layer, and the anti-reflection layer, wherein the anti-reflection layer contains the low-refractive-index particles as a constituent, as described above. Such a constitution is suitable for achieving high anti-reflective properties in the present anti-reflection film. In addition, the present anti-reflection film includes a hard coat layer between the substrate and the anti-reflection layer, as described above. Such a constitution is suitable for achieving high scratch resistance in the present anti-reflection film. In addition, the anti-reflection layer forming a laminated structure together with such a hard coat layer in the present anti-reflection film contains nanodiamond particles as a constituent, as described above. The constitution wherein the anti-reflection layer forming a laminated structure together with the hard coat layer contains the nanodiamond particles, i.e., fine particles of diamond, which has extremely high mechanical strength, is suitable for achieving high scratch resistance in the anti-reflection layer or the present anti-reflection film. As described above, the present anti-reflection film is suitable for achieving high scratch resistance together with high anti-reflective properties.

The anti-reflection layer preferably further contains a fluorine-containing curable compound. Such a constitution is preferred from the viewpoints of, such as anti-smudge properties, water repellency, oil repellency, slipperiness, and ease of wiping a fingerprint on the exposed surface of the anti-reflection layer.

The nanodiamond particles are preferably surface-modified nanodiamond particles with a silane coupling agent. The silane coupling agent is an organosilicon compound including both a silicon-containing reactive group that is to form a chemical bond with an inorganic material and an organic chain bonded to the silicon. The silane coupling agent of the surface-modified nanodiamond particles is bounded to the nanodiamond particle by forming a covalent bond with the surface of the nanodiamond particle with the reactive group. In an embodiment of the present invention, the silane coupling agent preferably includes an organic chain bonded to the nanodiamond particle and containing a (meth)acryloyl group. The (meth)acryloyl group means an acryloyl group and/or a methacryloyl group. The (meth)acryloyl group-containing organic chain of the silane coupling agent is preferably propyl acrylate and/or propyl methacrylate. In addition, the alkyl group as the organic chain of the silane coupling agent is preferably an alkyl group having from 1 to 18 carbons and more preferably a methyl group. These constitutions are suitable for achieving good dispersion state of the nanodiamond particles in the anti-reflection layer and thus suitable for achieving high transparency of the anti-reflection layer and in turn high transparency of the anti-reflection film.

The particle size D50 of the nanodiamond particles (including also the case of the surface-modified nanodiamond particles) is preferably 100 nm or less and more preferably 30 nm or less. Such a constitution is suitable for achieving high transparency of the anti-reflection layer and thus is suitable for achieving high transparency of the anti-reflection film.

The low-refractive-index particles are preferably hollow silica particles. In addition, the average particle size of the low-refractive-index particles is preferably from 50 to 70 nm. These constitutions are suitable for achieving good anti-reflective properties in the anti-reflection layer or the anti-reflection film. "Average particle size of the low-refractive-index particles" refers to the average particle size of the fine particles obtained from the fine particle size distribution measured by dynamic light scattering method.

The mass ratio of the low-refractive-index particles and the nanodiamond particles in the anti-reflection layer is preferably in a range from 99:1 to 84:16. Such a constitution is suitable for achieving a balance between anti-reflective properties and scratch resistance in the present anti-reflection film.

The curable resin in the anti-reflection layer is preferably a polymer of a (meth)acryloyl group-containing compound. Such a constitution is suitable for achieving high scratch resistance in the anti-reflection layer or the present anti-reflection film. In addition, when the curable resin in the anti-reflection layer is a polymer of a (meth)acryloyl group-containing compound, and the nanodiamond particles in the anti-reflection layer are surface-modified nanodiamond particles with a silane coupling agent including a (meth) acryloyl group in the surface organic chain, in the polymerization process of the curable resin component during the formation of the anti-reflection layer, the (meth)acryloyl group in the surface organic chain of the surface-modified nanodiamond particles and the curable resin component are readily allowed to react, and thus readily achieve a good dispersion state of the nanodiamond particles in the anti-reflection layer. Good dispersion of the nanodiamond particles in the anti-reflection layer contributes to achieving high transparency of the anti-reflection layer and in turn high transparency of the anti-reflection film.

The haze of the anti-reflection film according to an embodiment of the present invention is preferably 1.0% or less, more preferably 0.8% or less, more preferably 0.6% or less, more preferably 0.4% or less, and more preferably 0.2% or less. In the present invention, "haze" refers to a value measured in accordance with JIS K 7136. In the present anti-reflection film, the constitution wherein the haze is reduced to these degrees is preferred to ensure good transparency.

The luminous reflectance of the anti-reflection layer side in the anti-reflection film according to an embodiment of the present invention is preferably in the range from 0.5 to 2.0%, more preferably in the range from 0.5 to 1.7%, and more preferably in the range from 0.5 to 1.5%. In the present anti-reflection film, the constitution wherein the luminous reflectance is reduced to these degrees is preferred to ensure high anti-reflective properties.

DESCRIPTION OF EMBODIMENTS

Figure 1:
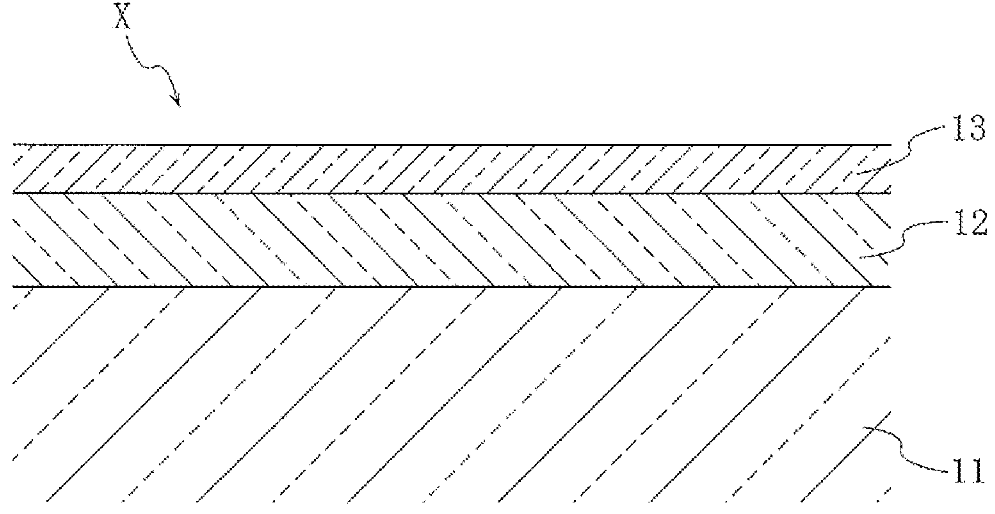
FIG. 1 is a partial cross-sectional view of an anti-reflection film according to an embodiment of the present invention.

FIG. 1 is a partial cross-sectional view of an anti-reflection film X according to an embodiment of the present invention. The anti-reflection film X includes a laminated structure including a substrate 11, a hard coat layer 12, and an anti-reflection layer 13. The anti-reflection film X may include an additional layer in the laminated structure thereof. Such an anti-reflection film X is, for example, provided for use on a surface of an optical member to reduce external light reflection on the surface of the optical member. Examples of the optical member include a transparent substrate for a flat panel display, such as a liquid crystal display, an organic electroluminescence display, and a plasma display; and a transparent panel for a touch panel.

The substrate 11 is a transparent substrate, for example, made of a transparent resin film through which light can penetrate. Examples of the transparent resin film for the substrate 11 include a cellulose acetate film, a polyester film, a polycarbonate film, and a polynorbornene film. Examples of the cellulose acetate film include a triacetyl cellulose film, a diacetyl cellulose film, a cellulose acetate propionate film, and a cellulose acetate butyrate film. Examples of the polyester film include a polyethylene terephthalate film and a polyethylene naphthalate film. The substrate 11 may be constituted of a single resin film or may include a laminated structure of a plurality of resin films. From the viewpoint of achieving sufficient transparency in the anti-reflection film X, the thickness of the substrate 11 is preferably 400 μm or less, more preferably 200 μm or less, and more preferably 100 μm or less.

The hard coat layer 12 is positioned between the substrate 11 and the anti-reflection layer 13, and has a pencil hardness of, for example, 2H or greater at least on the surface of the anti-reflection layer 13 side. The hard coat layer 12 contains at least a polymer or a cured product of a monomer and/or an oligomer of a polyfunctional (meth)acrylate including a plurality of (meth)acryloyl groups. The "(meth)acryloyl group" means an acryloyl group and/or a methacryloyl group. The "(meth)acrylate" means acrylate and/or methacrylate. Examples of the polyfunctional (meth)acrylate that forms a monomer or an oligomer contained in a composition for forming such a hard coat layer 12 include a bifunctional (meth)acrylate, a trifunctional (meth)acrylate, and a tetrafunctional or higher polyfunctional (meth)acrylate. Examples of the bifunctional (meth)acrylate include ethylene glycol di(meth)acrylate, diethylene glycol di(meth)acrylate, polyethylene glycol di(meth)acrylate, butanediol di(meth)acrylate, neopentyl glycol di(meth)acrylate, hexanediol di(meth)acrylate, and nonanediol di(meth)acrylate. Examples of the trifunctional (meth)acrylate include trimethylolethane tri(meth)acrylate, trimethylolpropane tri (meth)acrylate, glycerin tri(meth)acrylate, pentaerythritol tri(meth)acrylate, ditrimethylolpropane tri(meth)acrylate, and dipentaerythritol tri(meth)acrylate. Examples of the tetrafunctional or higher polyfunctional (meth)acrylate include pentaerythritol tetra(meth)acrylate, ditrimethylolpropane tetra(meth)acrylate, dipentaerythritol tetra(meth) acrylate, dipentaerythritol penta(meth)acrylate, ditrimethylolpropane penta(meth)acrylate, dipentaerythritol hexa (meth)acrylate, and ditrimethylolpropane hexa(meth) acrylate. The hard coat layer-forming composition may contain one type of polyfunctional (meth)acrylate or may contain two or more types of polyfunctional (meth)acrylates. The ratio of the polyfunctional (meth)acrylate in the monomer or oligomer in the hard coat layer-forming composition is preferably 50 mass % or greater and more preferably 75 mass % or greater.

The hard coat layer-forming composition may contain a monofunctional (meth)acrylate including one (meth)acryloyl group. Examples of such a monofunctional (meth) acrylate include β-carboxyethyl (meth)acrylate, isobornyl (meth)acrylate, octyl (meth)acrylate, decyl (meth)acrylate, EO-modified phenol (meth)acrylate, EO-modified nonylphenol (meth)acrylate, and EO-modified 2-ethylhexyl (meth)acrylate. The hard coat layer-forming composition may contain one type of monofunctional (meth)acrylate or may contain two or more types of monofunctional (meth) acrylates. In addition, the hard coat layer-forming composition may contain, as an acrylic oligomer, epoxy (meth) acrylate, polyester (meth)acrylate, urethane (meth)acrylate, or the like.

From the viewpoint of ensuring strength and smoothness of the hard coat layer 12 to be formed, the hard coat layer-forming composition preferably contains a fluorine-containing curable compound. Examples of such a fluorine-containing curable compound include a fluorinated alkyl (meth)acrylate, a fluorinated (poly)oxyalkylene glycol di(meth)acrylate, a fluorine-containing epoxy resin, and a fluorine-containing urethane resin. Examples of the fluorinated alkyl (meth)acrylate include perfluorooctylethyl (meth)acrylate and trifluoroethyl (meth)acrylate. Examples of the fluorinated (poly)oxyalkylene glycol di(meth)acrylate include fluoroethylene glycol di(meth)acrylate and fluoropropylene glycol di(meth)acrylate. Examples of commercially available products of such a fluorine-containing curable compound include "Polyfox 3320" from Omnova Solution, "KY-1203" from Shin-Etsu Chemical Co., Ltd., "Megafac RS-90" from DIC Corporation, and "Optool DSX" from Daikin Industries, Ltd.

The hard coat layer-forming composition preferably contains a polymerization initiator. Examples of the polymerization initiator include a photopolymerization initiator and a thermal polymerization initiator. Examples of the photopolymerization initiator include peroxide esters; other peroxides; benzoins; acetophenones; cyclohexyl phenyl ketones; anthraquinones; thioxanthones; ketals; benzophenones, such as benzophenone; xanthones; and titanocene compounds. Examples of the peroxide esters include 3,3',4,4'-tetra(t-butylperoxycarbonyl)benzophenone, 3,3'-di(t-butylperoxycarbonyl)-4,4'-di(methoxycarbonyl)benzophenone, and t-butyl peroxybenzoate. Examples of the peroxides include t-butyl hydroperoxide and di-t-butyl peroxide. Examples of the benzoins include benzoin, benzoin methyl ether, and benzoin ethyl ether. Examples of the acetophenones include acetophenone, 2,2-dimethoxy-2-phenylacetophenone, 2,2-diethoxy-2-phenylacetophenone, and 1,1-dichloroacetophenone. Examples of the cyclohexyl phenyl ketones include 1-hydroxycyclohexyl phenyl ketone. Examples of the anthraquinones include 2-methylanthraquinone and 2-ethylanthraquinone. Examples of the thioxanthones include 2,4-dimethylthioxanthone and 2,4-diethylthioxanthone. Examples of the ketals include acetophenone dimethyl ketal and benzyl dimethyl ketal. Examples of the thermal polymerization initiator include azo compounds, organic peroxides, and hydrogen peroxide. Examples of the azo compounds include 2,2'-azobisisobutyronitrile, 2,2'-azobis(2,4-dimethylvaleronitrile), 2,2'-azobis(4-methoxy-2,4-dimethylvaleronitrile), dimethyl-2,2'-azobis(2-methylpropionate), diethyl-2,2'-azobis(2-methylpropionate), and dibutyl-2,2'-azobis(2-methylpropionate). Examples of the organic peroxides include benzoyl peroxide, lauroyl peroxide, t-butyl peroxypivalate, and 1,1-bis(t-butylperoxy)cyclohexane.

The hard coat layer-forming composition preferably contains a solvent to adjust the coating properties and the like thereof. Examples of the solvent include methyl ethyl ketone, methyl isobutyl ketone, cyclohexanone, toluene, xylene, ethyl acetate, butyl acetate, 3-methoxybutyl acetate, methoxypropyl acetate, ethylene glycol monomethyl ether acetate, methanol, ethanol, isopropyl alcohol, 1-butanol, 1-methoxy-2-propanol, 3-methoxybutanol, ethoxyethanol, diisopropyl ether, ethylene glycol dimethyl ether, and tetrahydrofuran.

The hard coat layer 12 or the hard coat layer-forming composition may further contain an additive of various types, such as an anti-foaming agent, a photosensitizer, an ultraviolet absorber, an antioxidant, a photostabilizer, an anti-blocking agent, a leveling agent, a surfactant, an extender, a pigment, a dye, an antirust agent, an antistatic agent, and a plasticizer. In addition, the hard coat layer 12 or the hard coat layer-forming composition may contain a polymerizable component other than those described above.

From the viewpoint of the balance between the transparency in the anti-reflection film X and the hardness of the hard coat layer 12, the thickness of the hard coat layer 12 is preferably from 1 to 30 μm and more preferably from 3 to 10 μm.

The anti-reflection layer 13 in the anti-reflection film X contains a curable resin, low-refractive-index particles, and nanodiamond particles. The net refractive index of the anti-reflection layer 13 is lower than the net refractive index of the hard coat layer 12 and is, for example, from 1.3 to 1.4. The refractive index can be measured in accordance with JIS K 7142.

In the present embodiment, the curable resin in the anti-reflection layer 13 is a polymer of a (meth)acryloyl group-containing compound. The component for forming such a curable resin preferably contains a monomer and/or an oligomer for forming a cured acrylic resin by allowing a polymerization reaction to proceed by light irradiation or heating. A polyfunctional (meth)acrylate can be used as such a monomer or a monomer for forming the oligomer. Examples of the polyfunctional (meth)acrylate include a bifunctional (meth)acrylate, a trifunctional (meth)acrylate, and a tetrafunctional or higher polyfunctional (meth)acrylate. Examples of the bifunctional (meth)acrylate include ethylene glycol di(meth)acrylate, diethylene glycol di(meth) acrylate, polyethylene glycol di(meth)acrylate, butanediol di(meth)acrylate, neopentyl glycol di(meth)acrylate, hexanediol di(meth)acrylate, and nonanediol di(meth)acrylate. Examples of the trifunctional (meth)acrylate include trimethylolethane tri(meth)acrylate, trimethylolpropane tri (meth)acrylate, glycerin tri(meth)acrylate, pentaerythritol tri(meth)acrylate, ditrimethylolpropane tri(meth)acrylate, and dipentaerythritol tri(meth)acrylate. Examples of the tetrafunctional or higher polyfunctional (meth)acrylate include pentaerythritol tetra(meth)acrylate, ditrimethylolpropane tetra(meth)acrylate, dipentaerythritol tetra(meth) acrylate, dipentaerythritol penta(meth)acrylate, ditrimethylolpropane penta(meth)acrylate, dipentaerythritol hexa (meth)acrylate, and ditrimethylolpropane hexa(meth) acrylate. One type of polyfunctional (meth)acrylate, or two or more types of polyfunctional (meth)acrylates may be used as the monomer in the curable resin-forming component or the monomer for forming the oligomer in the curable resin-forming component. The ratio of the polyfunctional (meth)acrylate in the curable resin-forming component is preferably 50 mass % or greater and more preferably 75 mass % or greater.

The curable resin-forming component may contain a monofunctional (meth)acrylate including one (meth)acryloyl group. Examples of such a monofunctional (meth) acrylate include 3-carboxyethyl (meth)acrylate, isobornyl (meth)acrylate, octyl (meth)acrylate, decyl (meth)acrylate, EO-modified phenol (meth)acrylate, EO-modified nonylphenol (meth)acrylate, and EO-modified 2-ethylhexyl (meth)acrylate. The curable resin-forming component may contain one type of monofunctional (meth)acrylate or may contain two or more types of monofunctional (meth)acrylates. In addition, the curable resin-forming component may contain, as an acrylic oligomer, epoxy (meth)acrylate, polyester (meth)acrylate, urethane (meth)acrylate, or the like.

The curable resin-forming component preferably contains a fluorine-containing curable compound from the viewpoint of ensuring strength and surface slipperiness of the anti-reflection layer 13. The high strength and surface slipperiness of the anti-reflection layer 13 contribute to achieving high scratch resistance in the anti-reflection layer 13 or the anti-reflection film X. Examples of the fluorine-containing curable compound for the anti-reflection layer 13 include a fluorinated alkyl (meth)acrylate, a fluorinated (poly)oxyalkylene glycol di(meth)acrylate, a fluorine-containing epoxy resin, and a fluorine-containing urethane resin. Examples of the fluorinated alkyl (meth)acrylate include perfluorooctylethyl (meth)acrylate and trifluoroethyl (meth)acrylate. Examples of the fluorinated (poly)oxyalkylene glycol di(meth)acrylate include fluoroethylene glycol di(meth) acrylate and fluoropropylene glycol di(meth)acrylate. Examples of commercially available products of such a fluorine-containing curable compound include "Polyfox 3320" from Omnova Solution, "KY-1203" from Shin-Etsu Chemical Co., Ltd., "Megafac RS-90" from DIC Corporation, and "Optool DSX" from Daikin Industries, Ltd.

The curable resin-forming component preferably contains a polymerization initiator. Examples of the polymerization initiator include a photopolymerization initiator of various types and a thermal polymerization initiator of various types described above as the polymerization initiator in the hard coat layer-forming composition.

The low-refractive-index particles in the anti-reflection layer 13 are particles exhibiting a refractive index from 1.10 to 1.45 in the present embodiment. The refractive index can be measured in accordance with JIS K 7142. Examples of the constituent material of the low-refractive-index particles include $MgF_2$, LiF, AlF, 3NaF·AlF, and $Na_3AlF_6$. In addition, particles including a void inside the particle, such as hollow particles, may be used as the low-refractive-index particles. The particles including a void inside the particle have low net refractive index due to the combination of the refractive index of the constituent material portion and the refractive index of air (about 1) in the void portion. From the viewpoint of efficiently reducing the refractive index while ensuring hardness in the anti-reflection layer 13, the low-refractive-index particles are preferably hollow silica particles. Examples of commercially available products of the low-refractive-index particles include "Thrulya 4320" and "Thrulya 5320" available from JGC Catalysts & Chemicals Ltd., and "SiliNax" available from Nittetsu Mining Co., Ltd.

The average particle size of the low-refractive-index particles in the anti-reflection layer 13 is preferably from 50 to 70 nm from the viewpoint of achieving good anti-reflective properties in the anti-reflection layer 13 or the anti-reflection film X. The average particle size of the low-refractive-index particles refers to the average particle size of the fine particles obtained from the fine particle size distribution measured by dynamic light scattering method.

The content ratio of the low-refractive-index particles in the anti-reflection layer 13 is, for example, from 10 to 90 mass % and preferably from 30 to 70 mass %.

The nanodiamond particles in the anti-reflection layer 13 may be primary particles of nanodiamond or secondary particles of nanodiamond. The primary particles of nanodiamond refers to nanodiamond having a particle size of 10 nm or less. In addition, the nanodiamond particles are preferably nanodiamond particles formed by detonation method (detonation nanodiamond particles) as described below. By the detonation method, nanodiamond particles having a primary particle size of 10 nm or less can be appropriately formed.

From the viewpoint of dispersion stability, the nanodiamond particles in the anti-reflection layer 13 are preferably surface-modified nanodiamond particles to which surface a silane coupling agent is bonded. The silane coupling agent is an organosilicon compound including both a reactive group that contains silicon and is to form a chemical bond with an inorganic material and an organic chain bonded to the silicon, wherein the silane coupling agent of the surface-modified nanodiamond particles is bounded to the nanodiamond particle by forming a covalent bond with the surface of the nanodiamond particle with the reactive group. Examples of the reactive group of the silane coupling agent that is to form the silane coupling agent bonded to the nanodiamond particle include a silanol group (—SiOH) and a hydrolyzable group that can form a silanol group. Examples of such a hydrolyzable group include an alkoxysilyl group, such as a methoxy group and an ethoxy group, bonded to the silicon; a halosilyl group, such as chlorine and bromine, bonded to the silicon; and an acetoxy group bonded to the silicon. These hydrolyzable groups can form a silanol group through a hydrolysis reaction. A chemical bond can be formed between the silane coupling agent and the nanodiamond surface through a dehydration condensation reaction between the silanol group of the silane coupling agent and, for example, a hydroxyl group on the nanodiamond surface. The organic chain of the silane coupling agent preferably contains a (meth)acryloyl group or an alkyl group. Such a constitution facilitates the dispersion stability of the surface-modified nanodiamond particles in the anti-reflection layer 13. The (meth)acryloyl group-containing organic chain is preferably propyl acrylate and/or propyl methacrylate. The alkyl group that forms the organic chain of the silane coupling agent is preferably an alkyl group having from 1 to 18 carbons and more preferably a methyl group. Examples of the silane coupling agent in such surface-modified nanodiamond particles include 3-(trimethoxysilyl)propyl acrylate, 3-(trimethoxysilyl)propyl methacrylate, 3-(methyldimethoxysilyl)propyl methacrylate, 3-(methyldiethoxysilyl)propyl methacrylate, 3-(triethoxysilyl)propyl methacrylate, and trimethoxy(methyl) silane.

When the silane coupling agent in the surface-modified nanodiamond particles contains a (meth)acryloyl group in the organic chain of the silane coupling agent, in the polymerization process of the above monomer or oligomer for forming the curable resin, the (meth)acryloyl group in the surface organic chain of the surface-modified nanodiamond particles is allowed to react with the monomer or oligomer, and the nanodiamond particles are thereby readily incorporated into the curable resin. Examples of such a silane coupling agent include 3-(trimethoxysilyl)propyl acrylate, 3-(trimethoxysilyl)propyl methacrylate, 3-(methyldimethoxysilyl)propyl methacrylate, 3-(methyldiethoxysilyl)propyl methacrylate, and 3-(triethoxysilyl)propyl methacrylate.

The particle size D50 of the nanodiamond particles (including the case of the surface-modified nanodiamond particles) is preferably 100 nm or less and more preferably 30 nm or less. Such a constitution is suitable for achieving high transparency of the anti-reflection layer 13 and thus is suitable for achieving high transparency of the anti-reflection film X.

The content ratio of the nanodiamond particles in the anti-reflection layer 13 is, for example, from 0.1 to 15 mass % and preferably from 0.5 to 10 mass %. In addition, the mass ratio of the above low-refractive-index particles and the nanodiamond particles in the anti-reflection layer 13 is preferably in a range from 99:1 to 84:16. Such a constitution is suitable for achieving a balance between anti-reflective properties, scratch resistance, and transparency in the anti-reflection film X.

The composition for forming the anti-reflection layer 13 preferably contains a solvent to adjust the coating properties and the like, in addition to the above curable resin-forming component, the low-refractive-index particles, and the nanodiamond particles. Examples of the solvent include the same solvent as those described above as the solvent in the hard coat layer-forming composition.

The anti-reflection layer 13 or the anti-reflection layer-forming composition may further contain an additive of various types, such as an anti-foaming agent, a photosensitizer, an ultraviolet absorber, an antioxidant, a photostabilizer, an anti-blocking agent, a leveling agent, a surfactant, an extender, a pigment, a dye, an antirust agent, an antistatic agent, and a plasticizer.

The thickness of the anti-reflection layer 13 is, for example, from 0.07 to 0.13 μm and preferably from 0.08 to 0.12 μm.

The haze of the anti-reflection film X including the laminated structure as described above is preferably 1.0% or less, more preferably 0.8% or less, more preferably 0.6% or less, more preferably 0.4% or less, and more preferably 0.2% or less. In the present embodiment, the "haze" refers to a value measured in accordance with JIS K 7136. In the anti-reflection film X, the constitution wherein the haze is reduced to these degrees is preferred to ensure good transparency.

In addition, the luminous reflectance of the anti-reflection layer 13 side in the anti-reflection film X is preferably in the range from 0.5 to 2.0%, more preferably in the range from 0.5 to 1.7%, and more preferably in the range from 0.5 to 1.5%. In the present embodiment, the luminous reflectance refers to a value measured in accordance with JIS Z 8701. In the anti-reflection film X, the constitution wherein the luminous reflectance is reduced to these degrees is preferred to ensure high anti-reflective properties.

In the anti-reflection film X including the constitution as described above, the anti-reflection layer 13 contains the low-refractive-index particles as a constituent, as described above. Such a constitution is suitable for achieving high anti-reflective properties in the anti-reflection film X. In addition, the anti-reflection film X includes the hard coat layer 12 between the substrate 11 and the anti-reflection layer 13, as described above. Such a constitution is suitable for achieving high scratch resistance in the anti-reflection film X. In addition, the anti-reflection layer 13 forming a laminated structure together with such a hard coat layer 12 in the anti-reflection film X contains nanodiamond particles as a constituent, as described above. The constitution wherein the anti-reflection layer 13 forming a laminated structure together with the hard coat layer 12 contains the nanodiamond particles, i.e., fine particles of diamond, which has extremely high mechanical strength, is suitable for achieving high scratch resistance in the anti-reflection layer 13 or the anti-reflection film X. As described above, the anti-reflection film X is suitable for achieving high scratch resistance together with high anti-reflective properties.

Such an anti-reflection film X can be produced, for example, by sequentially forming the hard coat layer 12 and the anti-reflection layer 13 on the substrate 11. In forming the hard coat layer 12 on the substrate 11, first, the above hard coat layer-forming composition is coated on the substrate 11 to form a composition layer. Examples of the coating means include a bar coater, a spray coater, a spin coater, a dip coater, a die coater, a comma coater, and a gravure coater. The composition layer on the substrate 11 is then dried and cured. The hard coat layer 12 is thereby formed. In forming the anti-reflection layer 13 on the hard coat layer 12, first, the anti-reflection layer-forming composition containing at least the above curable resin-forming component, the low-refractive-index particles, and the nanodiamond particles is coated on the hard coat layer 12 to form a composition layer. Examples of the coating means include a bar coater, a spray coater, a spin coater, a dip coater, a die coater, a comma coater, and a gravure coater. The composition layer on the substrate 11 is then dried and cured. The anti-reflection layer 13 is thereby formed. The anti-reflection film X can be produced, for example, as described above.

Figure 2:
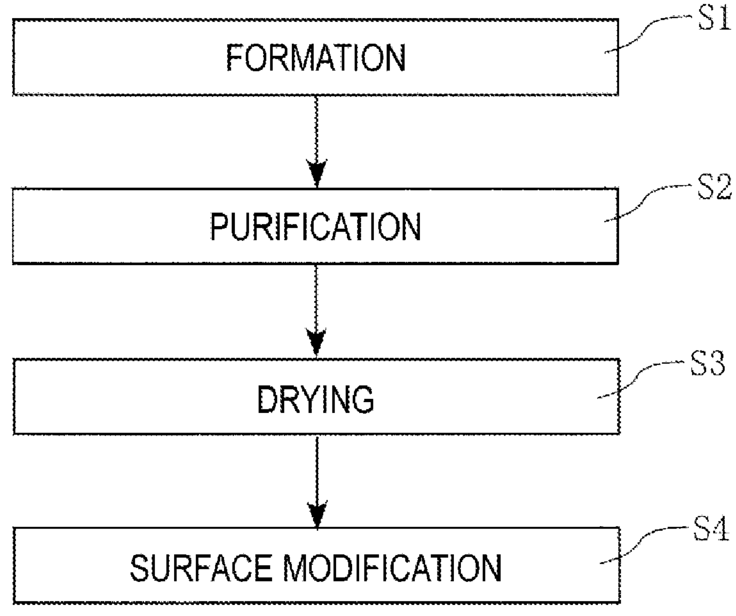
FIG. 2 is a flow diagram of an example of a method for producing surface-modified nanodiamond particles that can be used as a constituent of an anti-reflection layer of an anti-reflection film according to an embodiment of the present invention.

FIG. 2 is a flow diagram of an example of a method for producing the surface-modified nanodiamond particles that can be used as a constituent of the anti-reflection layer 13 or the anti-reflection layer-forming composition. The present method includes formation S1, purification S2, drying S3, and surface modification S4.

In the formation S1, a detonation method is performed to form nanodiamond. First, a molded explosive attached with an electric detonator is placed inside a pressure-resistant vessel for detonation, and the vessel is sealed in a state where gas of atmospheric composition at normal pressure and the explosive to be used coexist inside the vessel. The vessel is, for example, made of iron, and the volume of the vessel is, for example, from 0.5 to 40 $m^3$. A mixture of trinitrotoluene (TNT) and cyclotrimethylenetrinitramine, i.e., hexogen (RDX), can be used as the explosive. The mass ratio of TNT and RDX (TNT/RDX) is, for example, in a range from 40/60 to 60/40. The explosive is used in an amount, for example, from 0.05 to 2.0 kg.

In the formation S1, the electric detonator is then triggered to detonate the explosive in the vessel. "Detonation" refers to an explosion, among those associated with a chemical reaction, wherein a flame surface where the reaction occurs travels at a high speed exceeding the speed of sound. During the detonation, the explosive used partially causes incomplete combustion and releases carbon, and from the carbon as a raw material, nanodiamond is formed by the action of the pressure and energy of a shock wave that is generated in the explosion. The nanodiamond forms an aggregate first in a product resulting from the detonation method, wherein adjacent primary particles or crystallites very firmly aggregate with each other by contribution of Coulomb interaction between crystal planes in addition to the action of Van der Waals forces.

In the formation S1, then the temperatures of the vessel and the inside thereof are reduced by allowing the vessel to stand at room temperature, for example, for 24 hours. After the cooling, a nanodiamond crude product (containing the aggregate of the nanodiamond particles formed as described above and soot), which adheres to the inner wall of the vessel, is scraped with a spatula, and the nanodiamond crude product is thereby collected. By the detonation method as described above, a crude product of the nanodiamond particles can be obtained. In addition, the desired amount of the nanodiamond crude product can be obtained by performing the formation S1 as described above a necessary number of times.

The purification S2 in the present embodiment includes an acid treatment, which allows a strong acid to act on the raw material nanodiamond crude product, for example, in a water solvent. The nanodiamond crude product obtained by the detonation method is prone to contain a metal oxide, which is an oxide of a metal, such as Fe, Co, or Ni, derived from a vessel or the like used in the detonation method. The metal oxide can be dissolved and removed from the nanodiamond crude product by allowing a predetermined strong acid to act thereon (acid treatment), for example, in a water solvent. The strong acid used in the acid treatment is preferably a mineral acid, and examples thereof include hydrochloric acid, hydrofluoric acid, sulfuric acid, nitric acid, and aqua regia. In the acid treatment, one type of strong acid may be used, or two or more types of strong acids may be used. The concentration of the strong acid used in the acid treatment is, for example, from 1 to 50 mass %. The acid treatment temperature is, for example, from 70 to 150° C. The duration of the acid treatment is, for example, from 0.1 to 24 hours. In addition, the acid treatment can be performed under reduced pressure, under normal pressure, or under increased pressure. After such acid treatment, the solid content (containing the nanodiamond aggregate) is washed with water, for example, by decantation. The water washing of the solid content by decantation is preferably repeated until the pH of the precipitate solution reaches, for example, 2 to 3.

The purification S2 in the present embodiment includes an oxidation treatment for removing graphite from the nanodiamond crude product (the nanodiamond aggregate prior to completion of the purification) using oxidizing agent. The nanodiamond crude product obtained by the detonation method contains graphite (black lead). This graphite is derived from carbon that has not formed nanodiamond crystals among the carbons released when the explosive used has partially caused incomplete combustion. The graphite can be removed from the nanodiamond crude product, for example, by allowing a predetermined oxidizing agent to act thereon, for example, in a water solvent, for example, after the acid treatment described above. Examples of the oxidizing agent used in the oxidation treatment include sulfuric acid, nitric acid, chromic acid, chromic anhydride, dichromic acid, permanganic acid, and perchloric acid. In the oxidation treatment, one type of oxidizing agent may be used, or two or more types of oxidizing agents may be used. The concentration of the oxidizing agent used in the oxidation treatment is, for example, from 3 to 80 mass %. The oxidizing agent is used in the oxidation treatment in an amount, for example, from 300 to 500 parts by mass relative to 100 parts by mass of the nanodiamond crude product that is to be subjected to the oxidation treatment. The oxidation treatment temperature is, for example, from 100 to 200° C. The duration of the oxidation treatment is, for example, from 1 to 50 hours. The oxidation treatment can be performed under reduced pressure, under normal pressure, or under increased pressure. After such oxidation treatment, the solid content (containing the nanodiamond aggregate) is washed with water, for example, by decantation or centrifugal sedimentation method. The supernatant liquid from the initial water washing is colored, and thus the water washing of the solid content by decantation is preferably repeated until the supernatant liquid becomes visually transparent. The repeated water washing reduces or eliminates an impurity electrolyte (NaCl and the like). Low electrolyte concentration is suitable for achieving high dispersibility and high dispersion stability of the nanodiamond particles obtained by the present method.

After such oxidation treatment, the nanodiamond may be treated with an alkaline solution. The alkali treatment can convert an acidic functional group (for example, a carboxyl group) on the surface of the nanodiamond into a salt (for example, a carboxylate salt). Examples of the alkaline solution used include an aqueous sodium hydroxide solution. In the alkali treatment, the alkaline solution concentration is, for example, from 1 to 50 mass %, the treatment temperature is, for example, from 70 to 150° C., and the duration of the treatment is, for example, from 0.1 to 24 hours. In addition, after such alkali treatment, the nanodiamond may be treated with an acid solution. Through the acid treatment, the salt of the acidic functional group on the nanodiamond surface can be converted back to the free acidic functional group again. Examples of the acid solution used include hydrochloric acid. The acid treatment may be performed at room temperature or may be performed under heating. The solid content of the nanodiamond (containing the nanodiamond aggregate) that has undergone the alkali treatment after the oxidation treatment and the subsequent acid treatment is washed with water, for example, by decantation or centrifugal sedimentation method.

In the present method, the drying S3 is then performed. In the drying S3, for example, the liquid is evaporated from a nanodiamond-containing solution obtained through the purification S2 using an evaporator (evaporation to dryness). The residual solid content resulting from such evaporation to dryness may be further dried by heat drying in a drying oven. Through such drying S3, powder of the nanodiamond aggregate is obtained.

In the present method, the surface modification S4 is then performed. The surface modification S4 is for surface-modifying the nanodiamond particles contained in the nanodiamond aggregate obtained as described above by bonding a predetermined silane coupling agent to the nanodiamond particles. In the surface modification S4, first, a mixed solution containing, for example, the dried nanodiamond (the nanodiamond aggregate) obtained as described above, a silane coupling agent, and a solvent is stirred in a reaction vessel. Zirconia beads as disintegration media are then added to the mixed solution in the reaction vessel. The diameter of the zirconia beads is, for example, from 15 to 500 μm. The surface modification treatment is then performed on the nanodiamond in the solution using an ultrasonic generator equipped with an oscillator capable of oscillating an ultrasonic wave. Specifically, the tip of the oscillator of the ultrasonic generator is inserted into the reaction vessel and immersed in the solution, and an ultrasonic wave is generated from the oscillator. This treatment is preferably performed while the solution subjected to the treatment is cooled, for example, with ice water. The duration of such surface modification treatment is, for example, from 4 to 10 hours. The content ratio of the nanodiamond in the solution subjected to the present treatment is, for example, from 0.5 to 5 mass %, and the concentration of the silane coupling agent is, for example, from 5 to 40 mass %. Examples of the solvent to be used include tetrahydrofuran, acetone, methyl ethyl ketone, 1-methoxypropanol, methyl isobutyl ketone, isopropanol, or 2-butanol. In addition, the mass ratio of the nanodiamond and the silane coupling agent in the solution is, for example, from 2:1 to 1:10. In the present surface modification treatment, cavitation occurs in the solution subjected to ultrasonic irradiation based on the acoustic effect, and zirconia beads in the solution acquire extremely large kinetic energy by a jet blast generated when the cavitation (microbubbles) collapses. Then, the zirconia beads give impact energy to the nanodiamond aggregate in the same solution, the nanodiamond particles are thereby disintegrated from the nanodiamond aggregate (disintegration), and the silane coupling agent acts on the nanodiamond particles in a dissociated state to bond them. This bond is, for example, a covalent bond formed through a dehydration condensation reaction between the silanol group of the silane coupling agent and a surface hydroxyl group of the nanodiamond particles. When the silane coupling agent includes a hydrolyzable group, a silanol group can be formed even with slight moisture contained in the reaction system. The surface modification S4 as described above can produce the surface-modified nanodiamond particles containing the nanodiamond particles and the silane coupling agent bonded thereto, or a dispersion liquid thereof. If unreacted nanodiamond aggregate is present in the solution that has undergone the surface modification S4, the solution is allowed to stand, then the supernatant liquid is collected, and a surface-modified nanodiamond particle dispersion liquid containing a reduced amount of the unreacted nanodiamond aggregate can be thereby obtained. In addition, the resulting surface-modified nanodiamond particle dispersion liquid may be subjected to a solvent replacement procedure to change the solvent used in the surface modification S4 to another solvent.

For example, the surface-modified nanodiamond particle dispersion liquid produced as described above is mixed with the above curable resin-forming component, the low-refractive-index particles, and the like, and the above anti-reflection layer-forming composition can be thereby prepared.

EXAMPLES

Production of Dispersion Liquid of Surface-Modified Nanodiamond Particles $ND_1$ A dispersion liquid of surface-modified nanodiamond particles (ND dispersion liquid D1) was produced through the process as follows.

First, the formation of nanodiamond by a detonation method was performed. In the present formation, first, a molded explosive attached with an electric detonator was placed inside a pressure-resistant vessel for detonation, and the vessel was sealed. The vessel was made of iron, and the volume of the vessel was 15 $m^3$. As the explosive, 0.50 kg of a mixture of TNT and RDX was used. The mass ratio of the TNT and RDX (TNT/RDX) in the explosive was 50/50. The electric detonator was then triggered to detonate the explosive in the vessel (formation of nanodiamond by detonation method). Then the temperatures of the vessel and the inside thereof were reduced by allowing the vessel to stand at room temperature for 24 hours. After the cooling, a nanodiamond crude product (containing the aggregate of the nanodiamond particles and soot formed in the above detonation method), which adhered to the inner wall of the vessel, was scraped with a spatula, and the nanodiamond crude product was thereby collected.

The nanodiamond crude product obtained by performing the formation as described above multiple times was then subjected to acid treatment in the purification. Specifically, a slurry obtained by adding 6 L of 10 mass % hydrochloric acid to 200 g of the nanodiamond crude product was subjected to heating treatment under reflux at normal pressure conditions for 1 hour. The heating temperature in this acid treatment was from 85 to 100° C. Then, after cooling, the solid content (containing the nanodiamond aggregate and soot) was washed with water by decantation. The water washing of the solid content by decantation was repeated until the pH of the precipitate solution reached 2 from the low pH side.

An oxidation treatment of the purification was then performed. Specifically, 6 L of 98 mass % sulfuric acid and 1 L of 69 mass % nitric acid were added to the precipitate solution (containing the nanodiamond aggregate) obtained through decantation after the acid treatment to form a slurry, and then the slurry was subjected to heat treatment under reflux at normal pressure conditions for 48 hours. The heating temperature in this oxidation treatment was from 140 to 160° C. Then, after cooling, the solid content (containing the nanodiamond aggregate) was washed with water by decantation. The supernatant liquid from the initial water washing was colored, and thus the water washing of the solid content by decantation was repeated until the supernatant liquid became visually transparent.

The precipitate solution (containing the nanodiamond aggregate) obtained through decantation after the oxidation treatment was then subjected to drying treatment and dried powder was obtained (the drying). As a technique for the drying treatment, evaporation to dryness performed by using an evaporator was adopted.

The surface modification was then performed. Specifically, first, 0.30 g of the nanodiamond powder obtained through the above drying was weighed into a 50-mL sample bottle, and the nanodiamond powder and a mixed solution of 14 g of a solvent, tetrahydrofuran (THF), and 1.2 g of a silane coupling agent, 3-(trimethoxysilyl)propyl acrylate (available from Tokyo Chemical Industry Co., Ltd.), were stirred for 10 minutes. Then 34 g of zirconia beads (trade name "YTZ", diameter 30 μm, available from Tosoh Corporation) were added to the solution. The mixed solution was then subjected to surface modification treatment using a homogenizer (trade name "Ultrasonic Disperser UH-600S", available from SMT Co., Ltd.) as an ultrasonic generator. Specifically, an ultrasonic wave was generated from an oscillator in a state where the tip of the oscillator of the ultrasonic generator was inserted into the reaction vessel and immersed in the solution, and the mixed solution in the reaction vessel was subjected to ultrasonic treatment for 8 hours while the reaction vessel was cooled with ice water. In this treatment, the solution initially having turbid gray color gradually increased transparency while becoming black. This is thought to be because nanodiamond particles were sequentially disintegrated from the nanodiamond aggregate (disintegration), the silane coupling agent acted on the nanodiamond particles in a dissociated state to bond them, and thus surface-modified nanodiamond particles were stably dispersed in the THF solvent. The particle size D50 of the nanodiamond particles in the nanodiamond dispersion liquid after 8 hours of the surface modification treatment was 15 nm as measured by dynamic light scattering method as described below. As described above, the dispersion liquid of the surface-modified nanodiamond particles (surface-modified nanodiamond particles $ND_1$) was produced.

Production of Dispersion Liquid of Surface-Modified Nanodiamond Particles $ND_2$ After the same processes as those described above for the production of the ND dispersion liquid D1 were performed from the formation to the drying, a dispersion liquid of surface-modified nanodiamond particles (ND dispersion liquid D2) was produced through the surface modification as follows.

Into a 50-mL sample bottle, 0.30 g of the nanodiamond powder obtained through the drying was weighed, and the nanodiamond powder and a mixed solution of 14 g of a solvent, methyl isobutyl ketone (MIBK), and silane coupling agents, 0.6 g of trimethoxy(methyl)silane (available from Tokyo Chemical Industry Co., Ltd.) and 0.6 g of hexadecyltrimethoxysilane (available from Tokyo Chemical Industry Co., Ltd.), were stirred for 10 minutes. Then 34 g of zirconia beads (trade name "YTZ", diameter 30 μm, available from Tosoh Corporation) were added to the solution. The mixed solution was then subjected to surface modification treatment using a homogenizer (trade name "Ultrasonic Disperser UH-600S", available from SMT Co., Ltd.) as an ultrasonic generator. Specifically, an ultrasonic wave was generated from an oscillator in a state where the tip of the oscillator of the ultrasonic generator was inserted into the reaction vessel and immersed in the solution, and the mixed solution in the reaction vessel was subjected to ultrasonic treatment for 9 hours while the reaction vessel was cooled with ice water. In this treatment, the solution initially having turbid gray color gradually increased transparency while becoming black. This is thought to be because nanodiamond particles were sequentially disintegrated from the nanodiamond aggregate (disintegration), the silane coupling agent acted on the nanodiamond particles in a dissociated state to bond them, and alkyl surface-modified nanodiamond particles were stably dispersed in the MIBK solvent. The particle size D50 of the surface-modified nanodiamond after 9 hours of the surface modification treatment was 18 nm as measured by the dynamic light scattering method as described below. As described above, the dispersion liquid of the surface-modified nanodiamond particles (surface-modified nanodiamond particles $ND_2$) was produced.

Example 1

A hard coat layer and an anti-reflection layer were sequentially formed on a substrate as follows to produce an anti-reflection film of Example 1.

Formation of Hard Coat Layer

First, a hard coat layer-forming composition containing 100 parts by mass of a hexafunctional acrylic UV-curable monomer (trade name "DPHA", available from Daicel-Allnex Ltd.), 33 parts by mass of a trifunctional acrylic UV-curable monomer (trade name "PETIA", available from Daicel-Allnex Ltd.), 0.4 parts by mass of cellulose acetate propionate (trade name "CAP", available from EASTMAN), 0.03 parts by mass of a fluorine-containing UV-curable compound (trade name "Polyfox 3320", available from Omnova Solution), 2.7 parts by mass of a photopolymerization initiator (trade name "Irgacure 184", available from BASF), 1.3 parts by mass of a photopolymerization initiator (trade name "Irgacure 907", available from BASF), 187 parts by mass of methyl ethyl ketone, 31 parts by mass of 1-butanol, and 93 parts by mass of 1-methoxy-2-propanol was prepared. The hard coat layer-forming composition was then coated on a triacetyl cellulose (TAC) film having a thickness of 60 μm (available from Fujifilm Corporation), used as a transparent substrate, using a bar coater #18 to form a coated film, and then the coated film was dried at 60° C. for 1 minute using a dryer. The film with the coated film was then subjected to ultraviolet light curing treatment using an ultraviolet irradiation device (the light source was a high-pressure mercury lamp, available from Ushio Inc.). The ultraviolet irradiation dose thereof was 200 mJ/cm$^2$. A hard coat layer (hard coat layer $HC_1$) was thereby formed on the TAC film. That is, a TAC film with the hard coat layer $HC_1$ was produced. The thickness of the hard coat layer $HC_1$ was about 6 μm.

Formation of Anti-Reflection Layer

The supernatant liquid collected after the dispersion of the surface-modified nanodiamond $ND_1$ was allowed to stand for a whole day and night was added dropwise to a mixed solvent of 16 mL of toluene and 4 mL of hexane (the total amount of drop-wise addition was 10 mL). The mixed solvent after the drop-wise addition was subjected to centrifugal separation treatment (centrifugal force 20000×g, centrifugal time 10 minutes), and the precipitated solid content (surface-modified nanodiamond particles $ND_1$) was collected. Tetrahydrofuran (THF) was added to thus collected solid content to prepare a THF solution of the surface-modified nanodiamond particles $ND_1$ (solid concentration 6.5 mass %), and the solution was ultrasonicated for 10 minutes using an ultrasonicator (trade name "ASU-10", available from AS ONE Corporation). The surface-modified nanodiamond $ND_1$ in the THF solution after the ultrasonication had a particle size D50 of 12 nm as measured by dynamic light scattering method as described below. On the other hand, the THF solution after the ultrasonication (containing the surface-modified nanodiamond particles $ND_1$ with a solid concentration of 6.5 mass %) and an anti-reflection coating (trade name "ELCOM P-5062", available from JGC Catalysts & Chemicals Ltd., the content ratio of hollow silica particles, which were low-refractive-index particles, was 1.65 mass %, the content ratio of a curable resin component was 1.35 mass %, and the total solid concentration was 3 mass %), a fluorine-containing curable compound solution (trade name "KY-1203", available from Shin-Etsu Chemical Co., Ltd., fluorine-containing acrylic compound, solid concentration 20 mass %) were charged in a light-proof bottle in ratios of the solid content of the THF solution of 1.82 parts by mass and the solid content of the fluorine-containing curable compound solution of 12.73 parts by mass relative to 100 parts by mass of the hollow silica particles in the anti-reflection coating and mixed for 1 hour using a shaker. An anti-reflection layer-forming composition wherein the surface-modified nanodiamond $ND_1$ was dispersed was thus prepared. The anti-reflection layer-forming composition was then coated on the hard coat layer HC of the TAC film with the hard coat layer $HC_1$ using a bar coater #4 to form a coated film, and then the coated film was dried at 80° C. for 1 minute using a drier. The film with the coated film was then subjected to ultraviolet light curing treatment using an ultraviolet irradiation device (the light source was a high-pressure mercury lamp, available from Ushio Inc.) under a nitrogen atmosphere. The ultraviolet irradiation dose thereof was 200 mJ/cm$^2$. An anti-reflection layer (thickness of about 100 nm) was thereby formed on the hard coat layer $HC_1$ of the TAC film with the hard coat layer $HC_1$. As described above, the anti-reflection film of Example 1 including a laminated structure of the TAC film, the hard coat layer $HC_1$, and the anti-reflection layer (containing the surface-modified nanodiamond particles $ND_1$ together with the low-refractive-index particles) was produced.

Example 2

An anti-reflection film of Example 2 was produced in the same manner as in Example 1 with the exception that in preparation of the anti-reflection layer-forming composition, the solid content of the THF solution (containing the surface-modified nanodiamond particles $ND_1$ with a solid concentration of 6.5 mass %) was changed from 1.82 parts by mass to 9.09 parts by mass, and the solid content of the fluorine-containing curable compound solution (trade name "KY-1203", available from Shin-Etsu Chemical Co., Ltd.)

was changed from 12.73 parts by mass to 13.94 parts by mass, relative to 100 parts by mass of the hollow silica particles in the anti-reflection coating (trade name "ELCOM P-5062", available from JGC Catalysts & Chemicals Ltd.).

Example 3

An anti-reflection film of Example 3 was produced in the same manner as in Example 1 with the exception that in preparation of the anti-reflection layer-forming composition, the solid content of the THF solution (containing the surface-modified nanodiamond particles $ND_1$ with a solid concentration of 6.5 mass %) was changed from 1.82 parts by mass to 18.18 parts by mass, and the solid content of the fluorine-containing curable compound solution (trade name "KY-1203", available from Shin-Etsu Chemical Co., Ltd.) was changed from 12.73 parts by mass to 15.15 parts by mass, relative to 100 parts by mass of the hollow silica particles in the anti-reflection coating (trade name "ELCOM P-5062", available from JGC Catalysts & Chemicals Ltd.).

Example 4

The dispersion liquid of the surface-modified nanodiamond particles $ND_2$ (a solid concentration of 6.5 mass %) and an anti-reflection coating (trade name "ELCOM P-5062", available from JGC Catalysts & Chemicals Ltd., the content ratio of hollow silica particles, which were low-refractive-index particles, was 1.65 mass %, the content ratio of a curable resin component was 1.35 mass %, and the total solid concentration was 3 mass %), a fluorine-containing curable compound solution (trade name "KY-1203", available from Shin-Etsu Chemical Co., Ltd., fluorine-containing acrylic compound, solid concentration 20 mass %) were charged in a light-proof bottle in ratios of the solid content of the dispersion liquid of 9.09 parts by mass and the solid content of the fluorine-containing curable compound solution of 13.94 parts by mass relative to 100 parts by mass of the hollow silica particles in the anti-reflection coating and mixed for 1 hour using a shaker. An anti-reflection layer-forming composition wherein the surface-modified nanodiamond $ND_2$ was dispersed was thus prepared. The anti-reflection layer-forming composition was then coated on the hard coat layer $HC_1$ of the TAC film with the hard coat layer $HC_1$ using a bar coater #4 to form a coated film, and then the coated film was dried at 80° C. for 1 minute using a drier. The film with the coated film was then subjected to ultraviolet light curing treatment using an ultraviolet irradiation device (the light source was a high-pressure mercury lamp, available from Ushio Inc.) under a nitrogen atmosphere. The ultraviolet irradiation dose thereof was 200 mJ/cm$^2$. An anti-reflection layer (thickness of about 100 nm) was thereby formed on the hard coat layer $HC_1$ of the TAC film with the hard coat layer $HC_1$. As described above, the anti-reflection film of Example 4 including a laminated structure of the TAC film, the hard coat layer $HC_1$, and the anti-reflection layer (containing the surface-modified nanodiamond particles $ND_2$ together with the low-refractive-index particles) was produced.

Example 5

A hard coat layer and an anti-reflection layer were sequentially formed on a substrate as follows to produce an anti-reflection film of Example 5.

Formation of Hard Coat Layer

First, a hard coat layer-forming composition containing 100 parts by mass of a zirconia-dispersed acrylic UV-curable monomer (trade name "NSX-401M", available from Kyoeisha Chemical Co., Ltd., containing photopolymerization initiator), 117 parts by mass of methyl ethyl ketone, 23 parts by mass of 1-butanol, and 82 parts by mass of 1-methoxy-2-propanol was prepared. The hard coat layer-forming composition was then coated on a triacetyl cellulose (TAC) film having a thickness of 60 μm (available from Fujifilm Corporation), used as a transparent substrate, using a bar coater #18 to form a coated film, and then the coated film was dried at 60° C. for 1 minute using a dryer. The film with the coated film was then subjected to ultraviolet light curing treatment using an ultraviolet irradiation device (the light source was a high-pressure mercury lamp, available from Ushio Inc.). The ultraviolet irradiation dose thereof was 200 mJ/cm$^2$. A hard coat layer (hard coat layer $HC_2$) was thereby formed on the TAC film. That is, a TAC film with the hard coat layer $HC_2$ was produced. The thickness of the hard coat layer $HC_2$ was about 6 μm.

Formation of Anti-Reflection Layer

The anti-reflection coating (trade name "ELCOM P-5062", available from JGC Catalysts & Chemicals Ltd., the content ratio of hollow silica particles, which were low-refractive-index particles, was 1.65 mass %, the content ratio of a curable resin component was 1.35 mass %, and the total solid concentration was 3 mass %), a dispersion liquid of hollow silica particles (trade name "Thrulya 4320", available from JGC Catalysts & Chemicals Ltd., content ratio or solid concentration of hollow silica particles of 20 mass %), wherein the hollow silica particles were low-refractive-index particles, and isopropyl alcohol (IPA) were mixed in ratios of the solid content of Thrulya 4320 of 27.80 parts by mass and IPA of 798 parts by mass relative to 100 parts by mass of the hollow silica particles in the anti-reflection coating. The content ratio of the hollow silica particles in this mixed liquid was 1.83 mass %, the content ratio of the curable resin component was 1.17 mass %, and the total solid concentration was 3 mass %. Then this mixed liquid, the nanodiamond-containing THF solution after the ultrasonication (containing the surface-modified nanodiamond particles $ND_1$ with a solid concentration of 6.5 mass %) described above for Example 1, and the fluorine-containing curable compound solution (trade name "KY-1203", available from Shin-Etsu Chemical Co., Ltd., fluorine-containing acrylic compound, solid concentration 20 mass %) were charged in a light-proof bottle in ratios of the solid content of the THF solution of 4.92 parts by mass and the solid content of the fluorine-containing curable compound solution of 10.38 parts by mass relative to 127.8 parts by mass of the hollow silica particles in the above mixed liquid and mixed for 1 hour using a shaker. An anti-reflection layer-forming composition wherein the surface-modified nanodiamond $ND_1$ was dispersed was thus prepared. The anti-reflection layer-forming composition was then coated on the hard coat layer $HC_2$ of the TAC film with the hard coat layer $HC_2$ using a bar coater #4 to form a coated film, and then the coated film was dried at 80° C. for 1 minute using a drier. The film with the coated film was then subjected to ultraviolet light curing treatment using an ultraviolet irradiation device (the light source was a high-pressure mercury lamp, available from Ushio Inc.) under a nitrogen atmosphere. The ultraviolet irradiation dose thereof was 200 mJ/cm$^2$. An anti-reflection layer (thickness of about 100 nm) was thereby formed on the hard coat layer $HC_2$ of the TAC film with the hard coat layer $HC_2$. As described above, the anti-reflection film of Example 5 including a laminated structure of the TAC film, the hard coat layer $HC_2$, and the anti-reflection layer (containing the surface-modified nanodiamond particles $ND_1$ together with the low-refractive-index particles) was produced.

Comparative Example 1

An anti-reflection film of Comparative Example 1 was produced in the same manner as in Example 1 with the exception that in preparation of the anti-reflection layer-forming composition, the nanodiamond-containing THF solution was not used, and the solid content of the fluorine-containing curable compound solution (trade name "KY-1203", available from Shin-Etsu Chemical Co., Ltd.) was changed from 12.73 parts by mass to 12.12 parts by mass relative to 100 parts by mass of the hollow silica particles in the anti-reflection coating (trade name "ELCOM P-5062", available from JGC Catalysts & Chemicals Ltd.).

Measurement of Particle Size D50

The particle size D50 of the surface-modified nanodiamond particles contained in the surface-modified nanodiamond particle dispersion liquid was a particle size at 50% integrated value obtained from particle size distribution measured by the dynamic light scattering method (non-contact backscattering method) using an instrument available from Malvern Instruments Ltd. (trade name "ZetaSizer Nano ZS").

Total Light Transmittance

A total light transmittance (%) was measured for each of the anti-reflection films of Examples 1 to 5 and Comparative Example 1 using a total light transmittance measuring apparatus (trade name "NDH-5000W", available from Nippon Denshoku Industries Co., Ltd.). The present measurement was performed in accordance with JIS K 7105. The results are listed in Table 1.

Haze

A haze (%) was measured for each of the anti-reflection films of Examples 1 to 5 and Comparative Example 1 using a haze measuring apparatus (trade name "NDH-5000W", available from Nippon Denshoku Industries Co., Ltd.). The present measurement was performed in accordance with JIS K 7136. The results are listed in Table 1.

Luminous Reflectance

For each of the anti-reflection films of Examples 1 to 5 and Comparative Example 1, an optically clear adhesive (OCA) was adhered to the surface on the opposite side of the anti-reflection layer to form an adhesive surface, and a black acrylic plate was adhered to this adhesive surface to produce a sample for measurement. Then, a luminous reflectance (%) was measured on the anti-reflection layer side surface of the sample for measurement produced from each of the anti-reflection films of Examples 1 to 5 and Comparative Example 1 using a reflectance spectrophotometer (trade name "UH-3900", available from Hitachi High-Technologies Corporation). The present measurement was performed in accordance with JIS Z 8701. The results are listed in Table 1.

Scratch Resistance

The anti-reflection layer side surface of each of the anti-reflection films of Examples 1 to 5 and Comparative Example 1 was examined for scratch resistance using a scratch resistance tester and using steel wool #0000 (available from Nihon Steel Wool Co., Ltd.) as a rubbing material that was reciprocated on the surface to be tested. The present test was performed under a test environment at 23° C. and 50% RH, with a length of travel of the rubbing material on the surface to be tested of 10 cm, a load of the rubbing material on the surface to be tested of 200 g/cm$^2$, and reciprocations of the rubbing material on the surface to be tested of 1000 times. In the present test, the back surface of each film that had been undergone the rubbing operation under such conditions was painted over with a black marker pen, and then the degree of the scratch in the rubbed portion on the anti-reflection layer side surface was visually observed using reflected light. Then the scratch resistance of the anti-reflection layer side surface was evaluated for each of the anti-reflection films of Examples 1 to 5 and Comparative Example 1 based on the following evaluation criteria. Excellent: no scratches were observed even if carefully observed. Good: up to 5 scratches were observed when carefully observed. Poor: scratches were clearly visible. The results are listed in Table 1.

Evaluation

All of the anti-reflection films of Example 1 to 5 exhibited a total light transmittance of 94.9% or greater, a haze of 0.8% or less, and a luminous reflectance of 1.3% or less, and exhibited excellent scratch resistance.

TABLE 1

| | | | Example 1 | Example 2 | Example 3 | Example 4 | Example 5 | Comparative Example 1 |
|---|---|---|---|---|---|---|---|---|
| Transparent substrate | | | TAC Film | TAC Film | TAC Film | TAC Film | TAC Film | TAC Film |
| Hard coat layer | | | $HC_1$ | $HC_1$ | $HC_1$ | $HC_1$ | $HC_2$ | $HC_1$ |
| Anti-reflection layer | ELCOM P-5062 | Curable resin component | 81.82 | 81.82 | 81.82 | 81.82 | 81.82 | 81.82 |
| | | Low-refractive-index particles | 100.00 | 100.00 | 100.00 | 100.00 | 100.00 | 100.00 |
| | KY-1203 (Fluorine-containing curable compound) | | 12.73 | 13.94 | 15.15 | 13.94 | 10.38 | 12.12 |
| | Thrulya 4320 (low-refractive-index particles) | | — | — | — | — | 27.80 | — |
| | Nanodiamond particles | | $ND_1$ 1.82 | $ND_1$ 9.09 | $ND_1$ 18.18 | $ND_2$ 9.09 | $ND_1$ 4.92 | — |
| | Low-refractive-index particles/nanodiamond particles | | 98.2/1.8 | 91.7/8.3 | 84.6/15.4 | 91.7/8.3 | 96.3/3.7 | — |
| Total light transmittance (%) | | | 95.0 | 95.0 | 94.9 | 95.0 | 95.4 | 95.1 |
| Haze (%) | | | 0.2 | 0.2 | 0.2 | 0.2 | 0.8 | 0.2 |
| Luminous reflectance (%) | | | 1.0 | 1.1 | 1.3 | 1.1 | 0.5 | 1.1 |
| Scratch resistance | | | Excellent | Excellent | Excellent | Excellent | Excellent | Poor |

To summarize the above, the constitutions of the present invention and variations thereof are listed below as addenda.

Addendum 1

An anti-reflection layer having a laminated structure including:

a substrate;

an anti-reflection layer including a curable resin, low-refractive-index particles, and nanodiamond particles; and a hard coat layer positioned between the substrate and the anti-reflection layer.

Addendum 2

The anti-reflection film according to addendum 1, wherein the anti-reflection layer further includes a fluorine-containing curable compound.

Addendum 3

The anti-reflection film according to addendum 1 or 2, wherein the nanodiamond particles are surface-modified nanodiamond particles with a silane coupling agent.

Addendum 4

The anti-reflection film according to addendum 3, wherein the silane coupling agent is bonded to the nanodiamond particle and includes an organic chain containing a (meth)acryloyl group.

Addendum 5

The anti-reflection film according to addendum 4, wherein the (meth)acryloyl group is propyl acrylate and/or propyl methacrylate.

Addendum 6

The anti-reflection film according to addendum 3, wherein the silane coupling agent is bonded to the nanodiamond particle and includes an organic chain containing an alkyl group.

Addendum 7

The anti-reflection film according to addendum 6, wherein the alkyl group has from 1 to 18 carbons.

Addendum 8

The anti-reflection film according to addendum 7, wherein the alkyl group is a methyl group.

Addendum 9

The anti-reflection film according to any one of addenda 1 to 8, wherein a particle size D50 of the nanodiamond particles is 100 nm or less, or 30 nm or less.

Addendum 10

The anti-reflection film according to any one of addenda 1 to 9, wherein the low-refractive-index particles are hollow silica particles.

Addendum 11

The anti-reflection film according to any one of addenda 1 to 10, wherein an average particle size of the low-refractive-index particles is from 50 to 70 nm.

Addendum 12

The anti-reflection film according to any one of addenda 1 to 11, wherein a mass ratio of the low-refractive-index particles and the nanodiamond particles in the anti-reflection layer is in a range from 99:1 to 84:16.

Addendum 13

The anti-reflection film according to any one of addenda 1 to 12, wherein the curable resin is a polymer of a (meth)acryloyl group-containing compound.

Addendum 14

The anti-reflection film according to any one of addenda 1 to 13, wherein a haze is 1.0% or less, 0.8% or less, 0.6% or less, 0.4% or less, or 0.2% or less.

Addendum 15

The anti-reflection film according to any one of addenda 1 to 14, wherein a luminous reflectance of the anti-reflection layer side is in a range from 0.5 to 2.0%, in a range from 0.5 to 1.7%, or in a range from 0.5 to 1.5%.

REFERENCE SIGNS LIST

X Anti-reflection film

11 Substrate

12 Hard coat layer

13 Anti-reflection layer

The invention claimed is:

1. An anti-reflection film having a laminated structure comprising:

a substrate;

an anti-reflection layer comprising a curable resin, low-refractive-index particles, and nanodiamond particles; and a hard coat layer positioned between the substrate and the anti-reflection layer; and wherein a mass ratio of the low-refractive-index particles and the nanodiamond particles in the anti-reflection layer is in a range from 99:1 to 84:16;

wherein a content ratio of the low-refractive-index particles in the anti-reflection layer is from 30 mass % to 90 mass %;

wherein a content ratio of the nanodiamond particles in the anti-reflection layer is from 0.5 mass % to 15 mass %;

wherein a haze of the anti-reflection film is 0.8% or less, and wherein a luminous reflectance of the anti-reflection layer side is in a range from 0.5 to 1.3% when the anti-reflection film consists of the substrate, the anti-reflection layer, and the hard coat layer located between the base material and the anti-reflection layer.

2. The anti-reflection film according to claim 1, wherein the anti-reflection layer further comprises a fluorine-containing curable compound.

3. The anti-reflection film according to claim 1, wherein the nanodiamond particles are surface-modified nanodiamond particles with a silane coupling agent.

4. The anti-reflection film according to claim 3, wherein the silane coupling agent is bonded to the nanodiamond particle and comprises an organic chain comprising a (meth)acryloyl group.

5. The anti-reflection film according to claim 4, wherein the (meth)acryloyl group is propyl acrylate and/or propyl methacrylate.

6. The anti-reflection film according to claim 3, wherein the silane coupling agent is bonded to the nanodiamond particle and comprises an organic chain comprising an alkyl group.

7. The anti-reflection film according to claim 6, wherein the alkyl group has from 1 to 18 carbons.

8. The anti-reflection film according to claim 7, wherein the alkyl group is a methyl group.

9. The anti-reflection film according to claim 1, wherein the low-refractive-index particles are hollow silica particles.

10. The anti-reflection film according to claim 1, wherein an average particle size of the low-refractive-index particles is from 50 to 70 nm.

11. The anti-reflection film according to claim 1, wherein the curable resin is a polymer of a (meth)acryloyl group-containing compound.

12. The anti-reflection film according to claim 1, wherein the hard coat layer comprises a polymer or a cured product of a monomer and/or an oligomer of a polyfunctional (meth)acrylate including a plurality of (meth)acryloyl groups.

13. The anti-reflection film according to claim 1, wherein the hard coat layer comprises a monofunctional (meth)acrylate including one (meth)acryloyl group.

14. The anti-reflection film according to claim 1, wherein the hard coat layer comprises a fluorine-containing curable compound.

15. The anti-reflection film according to claim 1, wherein a thickness of the hard coat layer is from 1 to 30 μm.

16. The anti-reflection film according to claim 1, wherein a thickness of the anti-reflection layer is from 0.07 to 0.13 μm.

17. The anti-reflection film according to claim 1, wherein the nanodiamond particles are surface-modified nanodiamond particles with a silane coupling agent;

wherein the low-refractive-index particles are hollow silica particles;

wherein the hard coat layer comprises a monofunctional (meth)acrylate including one (meth)acryloyl group; and wherein the hard coat layer comprises a fluorine-containing curable compound.

* * * * *